C. E. McBeth.
Boring Attachment for Lathes.
No. 58,273.    Patented Sept. 25, 1866.
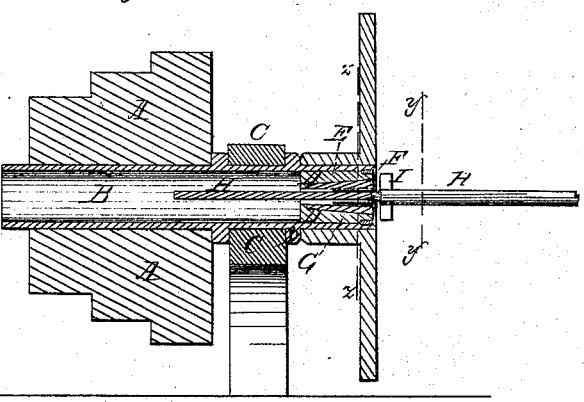
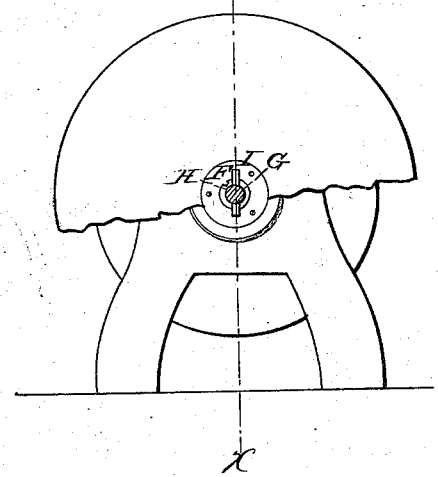
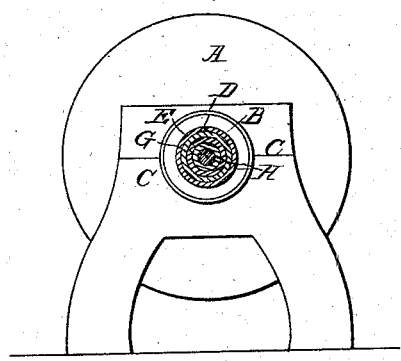
Witnesses:
Jas. A. Service
J. B. Covington
Inventor:
C. E. McBeth
per Munn & Co.
Attorneys

UNITED STATES PATENT OFFICE.

C. E. McBETH, OF HAMILTON, OHIO.

IMPROVED BORING ATTACHMENT TO LATHES.

Specification forming part of Letters Patent No. 58,273, dated September 25, 1866.

*To all whom it may concern:*

Be it known that I, C. E. McBETH, of Hamilton, Butler county, State of Ohio, have invented a new and useful Improvement in Boring Attachments to Turning-Lathes; and I do hereby declare that the following is a full, clear, and exact description thereof, which will enable others skilled in the art to make and use the same, reference being had to the accompanying drawings, forming part of this specification, in which—

Figure 1 is a longitudinal section of a portion of a lathe, showing my improvement attached, taken through the line $xx$, Fig. 2. Fig. 2 is a face view of the same, partly in section, through the line $yy$, Fig. 1. Fig. 3 is a cross-section of the same, taken through the line $zz$, Fig. 1, the face-plate being removed.

Similar letters of reference indicate like parts.

My invention has for its object to furnish an improvement in boring attachment to turning-lathes, by means of which holes can be made round, smooth, and straight; and it consists of an improved boring attachment to turning-lathes, formed by combining a thimble, bush, and cap with each other, with the hollow spindle, and with the mandrel, as hereinafter more fully described.

A is the lathe-cone, which is attached to the spindle B in the ordinary manner. The spindle B is supported by and revolves in bearings (one of which is shown at C) in the ordinary manner. The spindle B is hollow, and in its forward end is placed a bushing, D, having a tapering hole through it, as shown in Fig. 1. This bushing should be securely attached to the hollow spindle B, or, if desired, it may be made solid therewith. Into this tapering hole is fitted a thimble, E, as shown in Figs. 1 and 3. The thimble E is kept in its place by a ring, F, the outer diameter of which is equal to the outer diameter of the hollow spindle B, and its inner diameter is a little greater than the inner diameter of the thimble E, as shown in Fig. 1. This ring F is secured in place by screws, as shown.

G is a bushing, that fits into the thimble E, and has a flange which fits into the ring F. The thickness of the ring F and of the flange G is the same, so that their faces may be flush with each other, as shown in Fig. 1. The bush G and thimble E are made to revolve together by a pin inserted into the edge of the thimble E, and the projecting end of which fits into a slot formed in the flange of the bush G, as shown in Fig. 2.

H is the mandrel, the forward part of which fits into the bush G, and which is made to carry the bush G and thimble E with it in its revolution by a feather attached to the inner surface of the said bush G, and fitting into a longitudinal groove formed in the said mandrel, as shown in Figs. 1 and 3.

I is the cutter, which may be attached to the mandrel H by being passed through a hole or slot formed in said mandrel and firmly secured there; or it may be attached thereto in any other convenient manner. The other end of the mandrel H may be held and fastened in a socket, or secured in any other convenient manner.

The face-plate or chuck J is screwed upon or otherwise attached to the hollow spindle B, so that it may be carried with the said spindle in its revolution. To the face of this chuck J the article to be bored is accurately centered and securely attached in the ordinary manner, and the cutter is fed up to the revolving work by a feed-screw, or by a grooved pulley driven by a band, as may be most convenient.

I claim as new and desire to secure by Letters Patent—

An improved boring attachment to turning-lathes formed by combining a thimble, E, bush G, and cap or ring F, these parts being constructed and arranged as herein described with each other, with the hollow spindle B, and with the mandrel H, substantially as described, and for the purpose set forth.

C. E. McBETH.

Witnesses:
ALEX. W. SCOTT,
FRANK BECKETT.